United States Patent [19]

Schiffbauer et al.

[11] 4,377,726

[45] Mar. 22, 1983

[54] SELECTIVE PAGING AND INTERCOMMUNICATION SYSTEM

[75] Inventors: William H. Schiffbauer, Uniontown; Richard A. Watson, Finleyville, both of Pa.

[73] Assignee: The United States of America as represented by the Secretary of the Interior, Washington, D.C.

[21] Appl. No.: 152,212

[22] Filed: May 21, 1980

[51] Int. Cl.$^3$ ............................................. H04M 13/00
[52] U.S. Cl. ...................................... 179/1 H; 179/37
[58] Field of Search .................... 179/1 H, 1 HF, 2 R, 179/37, 38, 39, 40, 81 R, 99 A, 99 P, 84 SS, 17 A

[56] References Cited

U.S. PATENT DOCUMENTS

| | | | |
|---|---|---|---|
| 3,909,547 | 9/1975 | Day | 179/40 |
| 3,941,933 | 3/1976 | Shields | 179/1 H |
| 3,941,944 | 3/1976 | McIntosh | 179/99 A |
| 4,258,230 | 3/1981 | Heller et al. | 179/17 A |

OTHER PUBLICATIONS

NASA Tech. Briefs, "A Telephone Multiline Signaling System", vol. 4, No. 1, p. 33, Spring, 1979.

*Primary Examiner*—Joseph A. Popek
*Attorney, Agent, or Firm*—Thomas Zack; Donald A. Gardiner

[57] ABSTRACT

A battery powered paging and intercommunication system for application in a mine or other environment where it is necessary to conserve battery power comprises a plurality of transceivers electrically coupled to a common pair of signal lines. Each of the transceivers includes a push-to-talk switch for applying voice signals onto the lines as well as a push-to-page switch that amplifies received voice signals for reproduction through a loudspeaker. Each transceiver also includes dual tone multifrequency (DTMF) encoder and decoder circuitry for addressing a preselected transceiver on the lines for paging. A timer circuit within the transceiver limits the period of time the transceiver limits the period of time the transceiver is in the paging mode to reduce battery consumption. As a system check during paging, the called transceiver generates "beep-back" signals on the lines indicating to the calling transceiver that it is receiving paging signals. A second timer circuit controls a light flasher at the called transceiver to serve as a call back signal.

2 Claims, 4 Drawing Figures and INTERCOMMUNICATION SYSTEM

TECHNICAL FIELD

The present invention relates generally to a multiple transceiver paging and intercommunication system, and more particularly, to a battery operated multiple transceiver pager and intercommunication system wherein battery power consumption is minimized by providing selective paging and limiting the paging interval and wherein paging is confirmed by generating a "beep-back" signal to the calling transceiver and flashing a call back lamp at the called transceiver.

BACKGROUND ART

In a mine or other environment wherein communication is required among different regions, a transceiver located in each region is electrically coupled to a pair of phone lines that extend throughout the mine. The phone lines carry voice signals that are coupled between handsets during a push-to-talk mode of operation. During a push-to-page mode of operation, the voice signals are reproduced in a loudspeaker at the called transceiver.

A typical paging intercommunication system of the prior art is shown in Shields U.S. Pat. No. 3,941,933. Each transceiver is contained within a housing having a cradle supporting the handset and is electrically coupled to the signal lines through a connector. A speaker mounted within the housing broadcasts voice signals during paging under control of the calling transceiver. The handset contains a push-to-talk switch for coupling voice signals from a handset microphone onto the lines to be reproduced in the earpiece of the handset of the called transceiver. Mounted on the housing of the transceiver is a push-to-page switch that when depressed applies a d.c. voltage onto the phone lines to energize the loud speaker circuit of the called transceiver for paging.

One disadvantage of the prior art paging intercommunication system of the type shown in the Shields patent is that when the paging mode of a transceiver is operated (this is done by simultaneously pressing the push-to-page and push-to-talk switches), the paging amplifiers and loudspeakers on all transceivers coupled to the line are activated. Thus, the voice signal generated by the caller is reproduced simultaneously through the loudspeakers of all transceivers even though the page is relevant to only one transceiver in the system. As a result, battery power consumption is relatively high. Battery power consumption must be minimized, however, in a mining environment to increase system operating time as well as improve system reliability. As another disadvantage of the prior art paging intercommunication systems of this type, because paging is made through all loudspeakers, frequent paging is annoying to personnel and reduces attentiveness to the paging signals.

In order to provide a selectivity capability to paging communication systems whereby only a preselected transceiver, rather than all transceiver units coupled to the lines, is actuated to receive paging signals, addressing systems using conventional telephone rotary or TOUCH-TONE dials have been developed as shown in McIntosh U.S. Pat. No. 3,971,899 and Marshall U.S. Pat. No. 3,909,551. In the Marshall patent, rotary dial pulses are counted and converted into binary coded decimal (BCD) form representing the dialed number. The BCD data are supplied to operate relays that steer a ringing signal to the called station addressed at the rotary dial. In the McIntosh patent, steering circuitry responsive to either rotary dial or multi-frequency tone signals addresses preselected stations based upon either single digit or two digit codes.

Although battery consumption is thereby reduced, there is a tendency for the paging mode to be overused by the caller. In a mining environment, for example, the called party is frequently not available for immediate reply to the paging signal. The calling party thus tends to repeatedly page the party or to repeat the page at relatively short time intervals until the page is answered. In order to further reduce battery power consumption, it is necessary to limit use of the paging mode within the communication system while retaining the paging function.

One object of the present invention, therefore, is to provide an improved paging and intercommunication system wherein battery power consumption is minimized.

Another object of the present invention is to provide an improved paging and intercommunication system wherein battery power consumption is reduced compared to that of the selective paging and intercommunication systems of the prior art.

Another object is to provide an improved paging and intercommunication system having reduced battery consumption that can be added to existing transceiver systems.

Another object is to provide an improved paging and intercommunication system wherein battery consumption is minimized by eliminating the requirement of repeated or lengthy paging when the called party does not immediately respond.

Another object is to provide an improved paging and intercommunication system that is operable with virtually an unlimited number of transceiver stations.

DISCLOSURE OF INVENTION

In order to satisfy the above objectives, each transceiver of the type shown in Shields U.S. Pat. No. 3,941,933, supra, is provided with encoder and decoder circuitry to enable the transceiver to actuate the paging amplifier of a preselected transceiver on the signal lines. Each transceiver is also provided with a timer that limits the paging interval to 20 seconds or other predetermined interval. As a system check, once addressed, the called transceiver generates a "beep-back" signal on the lines to indicate to the calling transceiver that paging is under way. A call back signal lamp at the called transceiver is flashed for a second predetermined time interval, e.g., 20 minutes, to signal that a paging signal has been unanswered. The call back signal is automatically reset when a return call is made at the called station.

The decoder at each transceiver includes three piezoelectrically actuated tuning forks that are selectively responsive to first and second dual tone multifrequency (DTMF) signals generated by the encoder of the calling transceiver. Since the piezoelectrically actuated tuning fork detectors require no quiescent power consumption, battery drain during dormancy is minimized.

To address a particular transceiver station on the lines, two successive DTMF digits are generated using a "TOUCH-TONE" keyboard at the handset of the transceiver. In response to detection of the first and second successive DTMF digit signals, the decoder of the addressed or called transceiver station generates respectively first and second successive decoder signals. The pager amplifier at the called station is enabled (turned on) for a 20 second time duration only if the second DTMF signal is received by the called station within a 2 second time interval following receipt of the first digit DTMF signal; otherwise, the decoder is reset and enabled to receive another 2 digit address.

Still other objects and advantages of the present invention will become readily apparent to those skilled in this art from the following detailed description, wherein we have shown and described only the preferred embodiment of the invention, simply by way of illustration of the best mode contemplated by us of carrying out our invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

Figure 1:
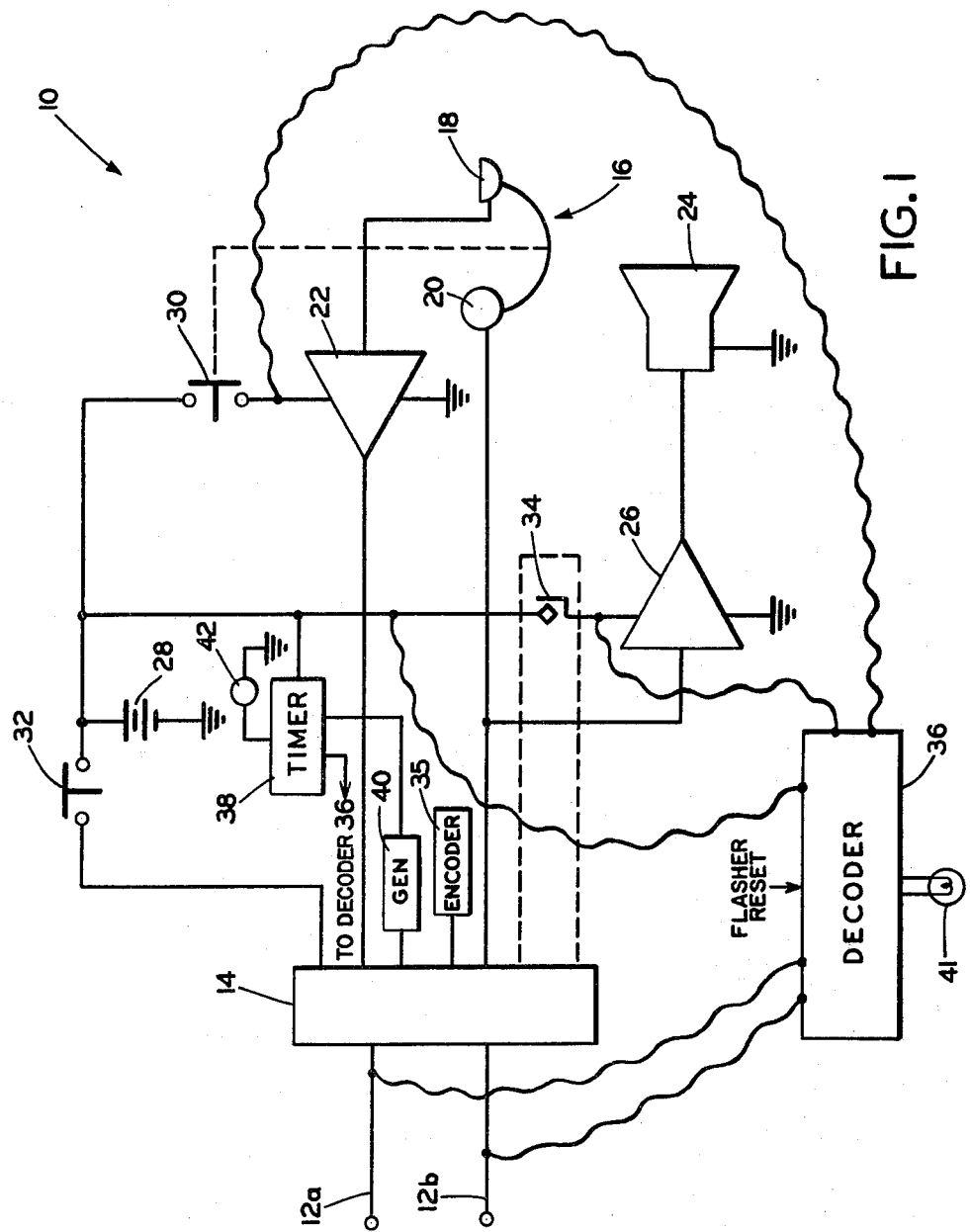
FIG. 1 is a simplified schematic diagram showing a pager and intercommunication system of the prior art retrofitted with encoder and decoder circuitry as well as a "beep-back" generator and call back lamp in accordance with the invention.

Referring to FIG. 1, transceiver 10 is coupled to a pair of phone lines 12a and 12b through a conventional telephone line interface unit 14. Although not shown, it is to be understood that a plurality of additional transceivers 10 are coupled to the phone lines 12a, 12b to form a paging and intercommunication system wherein voice signals are transmitted among different regions of a mine or other environment.

Each transceiver 10 is generally of a type shown in U.S. Pat. No. 3,941,933 to Shields incorporated herein by reference in its entirety. Transceiver 10 includes a handset 16 to which is mounted a microphone 18 for transmitting voice signals to the phone lines through amplifier 22 and an earphone 20 for receiving voice signals generated by other transceivers on the lines 12a, 12b. The transceiver 10 also includes a loudspeaker 24 mounted within the housing (not shown) of the transceiver 10, to reproduce voice signals amplified by loudspeaker amplifier 26 in a paging mode of operation. The handset 16 is normally positioned on a cradle pivoted to the housing, as shown in the Shields patent. The cradle is mechanically coupled to a line switch that places the transceiver 10 "on hook" or "off hook".

The transceiver 10 is powered by a battery 28 carried within the transceiver housing. Microphone amplifier 22 is energized by battery 28 through a push-to-talk switch 30 mounted on the handset 16 of the transceiver. The loudspeaker amplifier 26 is energized by battery 28 through a push-to-page switch 32 mounted on the housing of the transceiver 10. The push-to-page switch 32, when depressed, applies battery voltage to the phone lines 12a, 12b to close paging relay 34 and thereby reproduce voice signals through the loudspeaker 24 of the transceiver being paged.

In the transceivers of the prior art of the type shown in the Shields patent, supra, depression of push-to-page switch 32 applies d.c. power from battery 28 to the push-to-page relays 34 of all transceivers 10 coupled to the phone lines 12a, 12b. In accordance with one aspect of the present invention, paging is made selective by an encoder 35 that is preferably in the form of a dual tone multifrequency (DTMF) encoder, such as the Model 2006 dialer supplied by Buscom, Inc. and a novel decoder 36 that responds to incoming DTMF signals to close the push-to-page relay 34 of only the called transceiver and thereby energize push-to-page amplifier 26 and loudspeaker 24. Also in accordance with the invention, to reduce battery power consumption, each time push-to-page switch 32 is manually operated, causing closing of the paging relay 34 of the called transceiver, a time 38 controls the paging relay 34 to open a predetermined time interval (e.g., 20 seconds) following closing so that the paging message is time limited. During the paging cycle timing interval, a "beep-back" signal generator 40 applies periodic tone bursts to the phone lines 12a, 12b to indicate to the calling transceiver that the called transceiver is enabled to receive paging signals. A call back flasher or lamp 41 at the called station is controlled to flash to indicate at the called station that there has been an unanswered page. The flasher 41 is operated by timer 38 for a predetermined period of time, e.g., 20 minutes, and is then reset. The flasher 41 is automatically reset when the handset 16 is removed from its cradle (taken off hook) to respond to the page.

Figure 2:
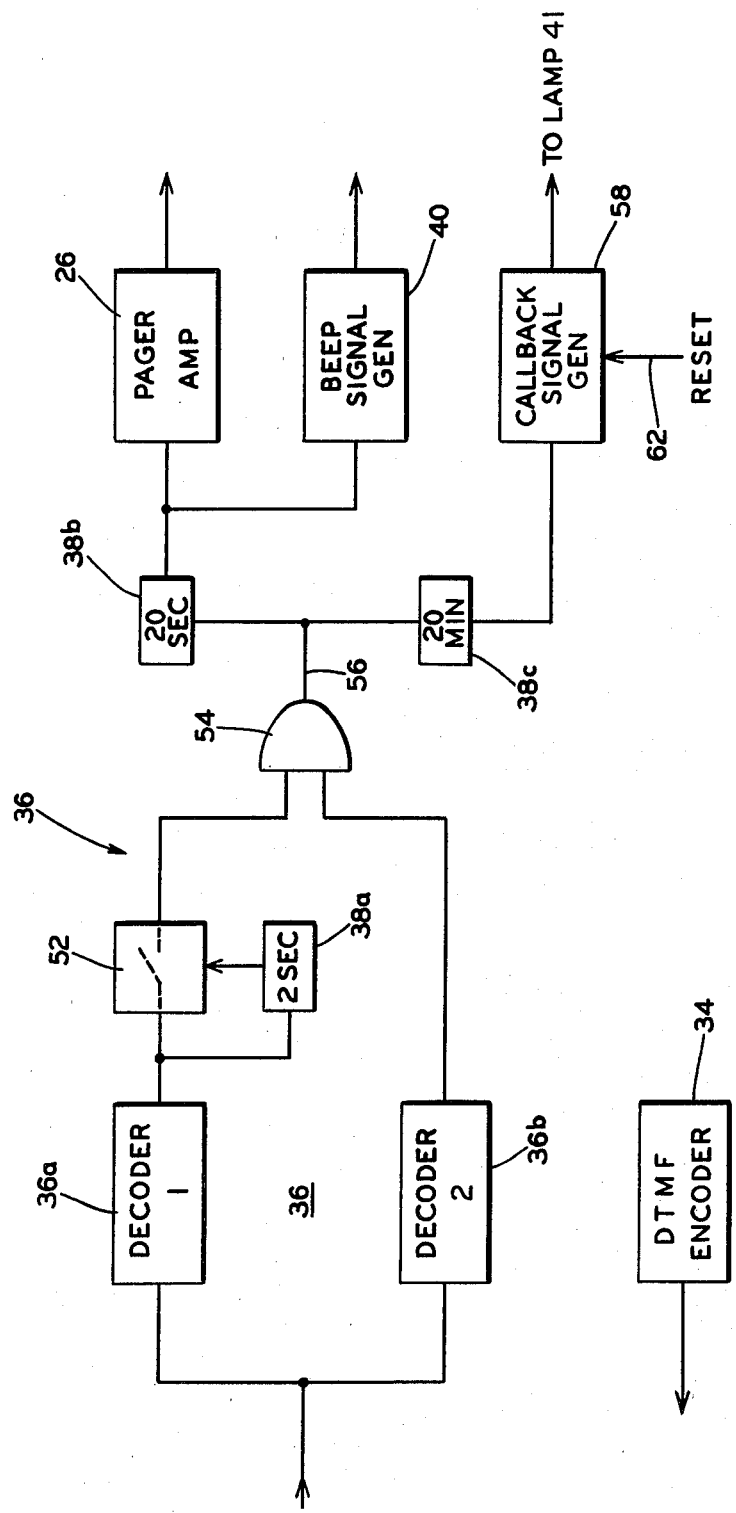
FIG. 2 is a simplified block diagram showing in simplified form the decoder network of FIG. 1 together with timers for controlling the paper amplifier, "beep-back" signal generator and call back lamp of the invention.

Referring to FIG. 2, the operation of certain portions of the transceiver 10 is shown in somewhat more detail. The decoder section 36 comprises first and second digit decoders 36a, 36b, described in more detail below, that respond to preselected dual tone multifrequency (DTMF) signals on the phone lines 12a, 12b to generate detector signals. DTMF encoder 34, in response to depression of digit keys of a TOUCH-TONE keyboard, generates sinusoidal tones divided into a high frequency group and a low frequency group. The frequencies generated in response to each digit are shown below.

TABLE I

| FREQ/NO. | 1209 Hz | 1336 Hz | 1477 Hz |
| --- | --- | --- | --- |
| 697 Hz | 1 | 2 | 3 |
| 770 Hz | 4 | 5 | 6 |
| 952 Hz | 7 | 8 | 9 |
| 941 Hz | * | 0 | # |

Thus, corresponding to each digit, there are two frequencies generated. Digit 5, for example, causes generation of a low frequency tone of 770 Hz and a high frequency tone of 1336 Hz. In order to simplify decoder design, certain of the digits have a common tone frequency in the upper or lower frequency group. The digits 4, 5 and 6, for example, each has a low frequency tone of 770 Hz, whereas digits 2, 5 and 8 each has a common frequency tone of 1336 Hz. Based upon two digits, the coding technique shown in the array of Table I makes available 60 unique addresses. It is to be understood, however, that other codes can be established to increase the number of available addresses.

Timer 38 shown in FIG. 1 comprises three timer sections, viz, a 2 second timer 38a, a 20 second timer 38b and a 20 minute timer 38c. The 2 second timer 38a controls the operation of a switch 52 at the output of decoder 36a that is connected to one input of an AND gate 54 whereas the output of decoder 36b is connected directly to a second input of the AND gate. The purpose of switch 52 and 2 second timer 38a is to activate the pager circuit of the addressed transceiver only if the second digit tone signal is received within a time interval of 2 seconds following receipt of the first digit tone; otherwise, the decoder is reset to await for a correct first digit tone. Thus, if decoder circuit 36 detects the presence of the first digit tone, the decoder 36a triggers 2 second timer 38a to close switch 52 to apply the logic one output of the decoder to a first input of AND gate 54 for a 2 second time interval. If the second digit tone is detected by decoder 36b within the 2 second interval, the decoder 36b applies a logic one signal to the second input of AND gate 54 whereby the gate generates an enabling signal at gate output 56. If no second digit tone is detected by detector 36b within the 2 second interval, however, timer 38a opens switch 52 and no subsequently received second digit tone will control gate 54 to generate an enabling signal.

In response to the enable signal generated by AND gate 54, 20 second timer 38b and 20 minute timer 38c are triggered. The 20 second timer 38b controls the on period of pager amplifier 26 as well as of beep signal generator 40. As mentioned above, the pager amplifier 26 amplifies voice signals on the phone lines 12a and 12b to be reproduced in pager speaker 24. The beep-back signal generator 40 applies intermittent tones onto the phone lines 12a, 12b during the on period of the pager amplifier 26 to confirm to the calling transceiver station that the paging mode is under way. Both the pager amplifier 26 and beep signal generator 40 are disabled after the 20 second timing interval of timer 38b. The output of 20 minute timer 38c controls a call back signal generator 58 that in turn controls flashing of call back signal lamp 41 providing a "call back" message at the called station. The call back signal generator 58 is disabled at the end of the 20 minute timing interval of timer 38c. Alternatively, if the handset of the called station is taken off hook during the 20 minute "call back" period, the call back signal generator is automatically reset at reset line 62.

Figure 3A:
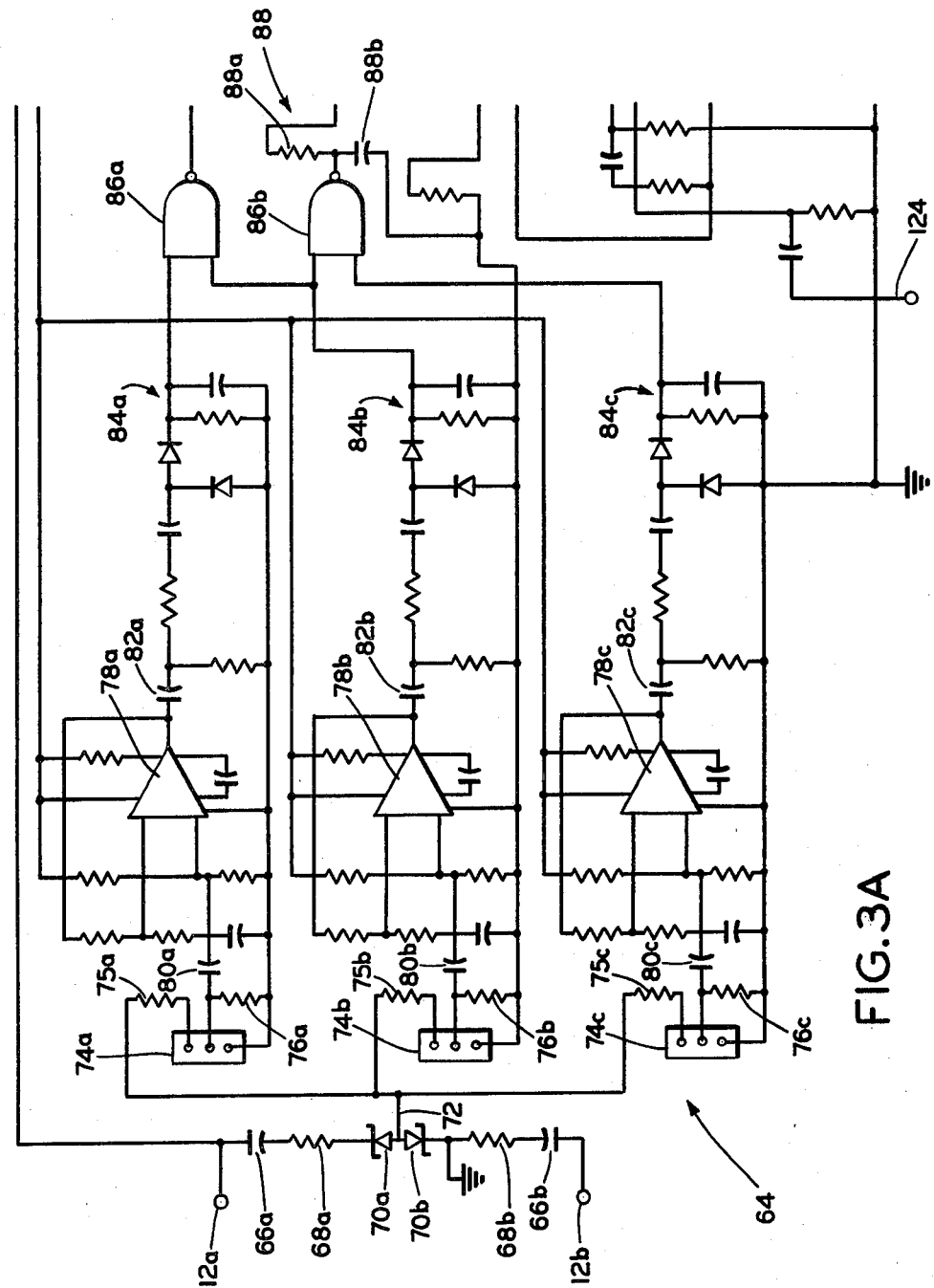
FIGS. 3A and 3B are a schematic diagram showing detailed circuitry constituting the block diagram of FIG. 2.
Figure 3B:
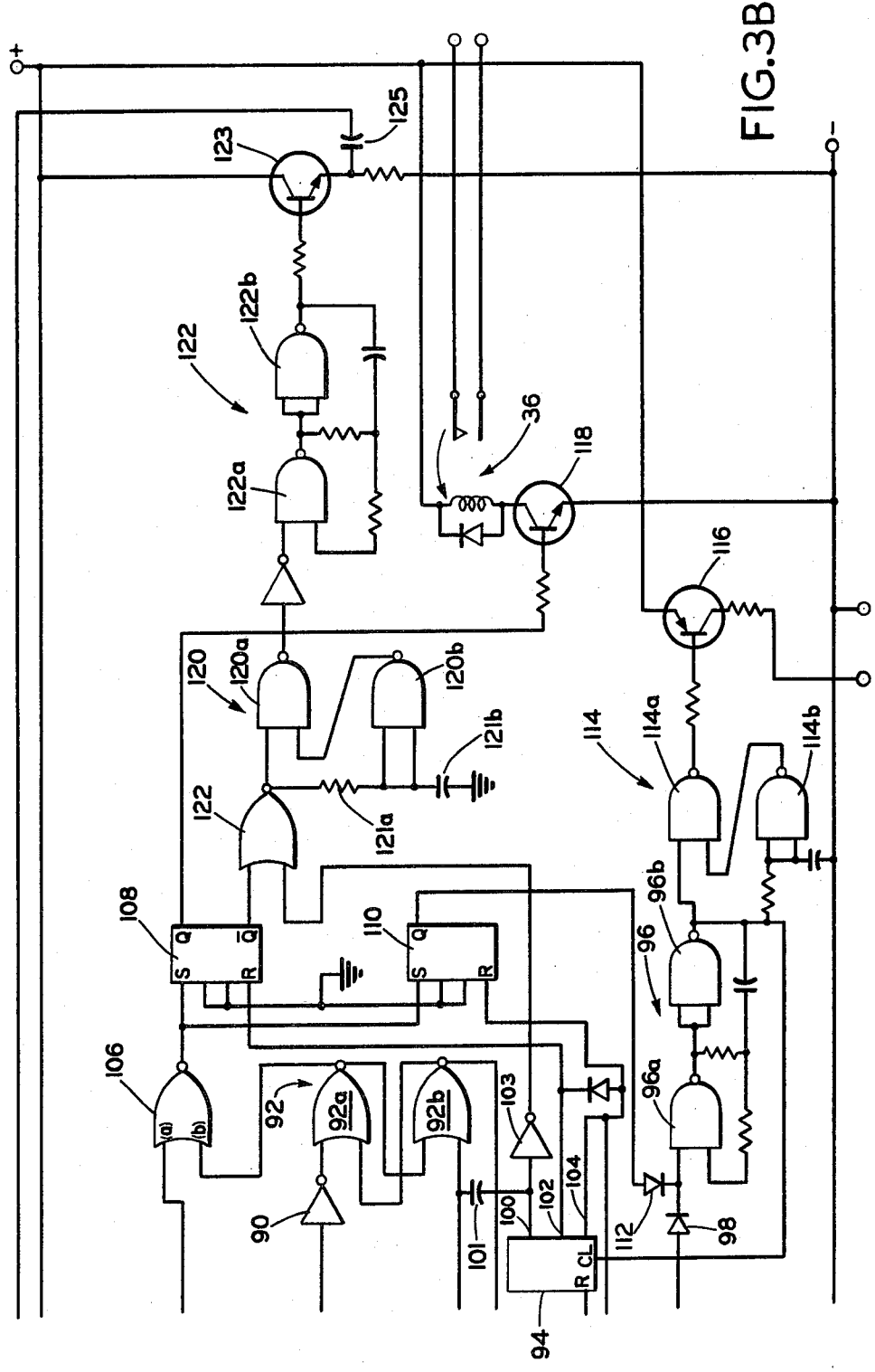

Referring now to FIGS. 3A and 3B, a detailed circuit description corresponding to the block diagram of FIG. 2 will be given. As an overview, decoder 36 includes piezoelectrically activated tuning forks 74a–74c. Gate 106 in FIG. 3b corresponds functionally to AND gate 54 in FIG. 2. The 2 second, 2 minute and 20 minute timing signals are generated by one Hz pulse generator 96 and counter 110 (FIG. 3B). Call back signal generator 58 in FIG. 2 corresponds to circuit 114 in FIG. 3B and "beep-back" signal generator 40 in FIG. 2 is shown generally by circuit 122 in FIG. 3B. Pager amplifier 26 (FIG. 2) is controlled by circuit 108 (FIG. 3B).

Signals from phone lines 12a and 12b (see FIG. 3A) are coupled to transceiver control circuit 64 through capacitors 66a, 66b and resistors 68a, 68b as well as Zener diodes 70a, 70b. The capacitors 66a, 66b provide d.c. isolation between circuit 64 and phone lines 12a, 12b. Resistors 68a and 68b reduce loading of the phone lines 12a, 12b by circuit 64 and diodes 70a, 70b suppress phone line transients from being impressed onto the circuit 64. The input signal obtained at line 72 is supplied in parallel through isolation resistors 75a–75c to each of three conventional piezoelectrically actuated tuning forks 74a, 74b and 74c. Each of the forks 74a–74c generates an output a.c. signal in response to receipt of an electrical signal at its unique resonant frequency. The tuning forks 74a and 74b correspond to one dual tone digit wherein forks 74b and 74c correspond to the second dual tone digit. Three tuning forks, rather than four tuning forks, are required to decode two dual tone digits due to the coding technique using redundancies shown in Table I, supra.

The outputs of the three tuning forks 74a–74c are generated across load resistors 76a–76c and through coupling capacitors 80a–80c to the inputs of high impedance, low power consumption amplifiers 78a–78c, respectively. The outputs of amplifiers 78a–78c are supplied through coupling capacitors 82a–82c to rectifier/voltage doublers 84a, 84b, and 84c, which rectify the a.c. signals generated by amplifiers 78a–78c and provide filtering while doubling the resultant d.c. level outputs. The outputs of circuits 84a–84c are supplied to NAND gates 86a and 86b which generates signals in response, respectively, to receipt of the first and second preselected digit tones by the tuning forks 74a–74c. The two inputs of gate 86a are responsive respectively to the outputs of doublers 84a and 84b whereas the inputs of gate 86b are responsive to the outputs of doublers 84b and 84c. Thus, NAND gate 86b generates a logic zero signal in response to the first dual tone multifrequency signal received by forks 74b and 74c whereas gate 86a generates a logic zero signal in response to the second digit dual tone multifrequency signal received by forks 74b and 74a. The logic zero signal generated by gate 86b is delayed by a delay trigger circuit 88 comprised of a resistor 88a and a capacitor 88b. The purpose of the delay at the output of gate 86b is to prevent decoder falsing when more than two signals are present at one time.

The output of gate 86a is applied to one input (a) of a NOR gate 106 whereas the delayed output of circuit 88 is applied through inverter 90 to the set input of a flip-flop 92 formed of cross coupled NOR gates 92a and 92b. When set, the output of gate 92a which is applied to the second input (b) of NOR gate 106 is at logic zero and the output of gate 92b is at logic one. The logic one signal at the output of NOR gate 92b is supplied to the reset terminal R of a counter 94 as well as through a steering diode 98 to the trigger terminal of the triggerable master clock circuit 96. The master clock 96 formed of NAND gates 96a and 96b together with associated feedback circuitry generates a 1 Hz time base that is supplied to clock input CL of the counter 94. The counter 94 counts the time pulses generated by clock 96 and is internally programmed to generate output signals on lines 100, 102 and 104 respectively at 2 seconds, 20 seconds and 20 minutes.

After the 2 second timing interval, counter output 100 resets flip-flop 92 through capacitor 101 to cause the output of gate 92a to switch to a logic one level and the output of gate 92b to switch to a logic zero level.

The logic zero level at the output of gate 92a during the two second time interval following setting is applied to input (b) of NOR gate 106. The output of gate 86a applied to the input (a) of NOR gates 106 is normally at logic one but switches to logic zero in response to the second digit. Thus, if input (a) of gate 106 receives a logic zero level within the 2 second interval when input (b) is also at logic zero (because flip-flop 92 is set, and this condition occurs only if both address digits are received within the 2 second time interval), the output of gate 106 switches to a logic one, setting flip-flop 108 to an output Q of logic one and turning on the pager amplifier 26 through transistor 118 and relay 36. If the second digit is not received within the 2 second time interval established by output 100 of counter 94, the decoder resets until another logic zero output is generated by first digit decoder output 86b.

The output of gate 106 also sets flip-flop 110 which through steering diode 112 latches on master clock 96. The output of clock 96, besides forming a time base for counter 94, triggers a flasher circuit 114 comprising gates 114a, 114b that flashes lamp 41 (FIG. 1) through driver transistor 116.

The complementary output $\overline{Q}$ of flip-flop 108 and 2 second output 100 of counter 94 (inverted by inverter 103) are supplied to the inputs of NOR gate 122. The output of gate 122 is thus strobed at a 4 second period to control the output of beep-back trigger circuit 120 comprised of gates 120a, 120b and RC timing circuit 121a, 121b. The output of trigger circuit 120 in turn controls beep-back oscillator 122 comprising gates 122a, 122b and associated feedback circuitry, to generate 4 second bursts into the telephone lines through transistor 123 and coupling capacitor 125.

After 20 seconds, the output 102 of counter 94 switches to logic one which resets flip-flop 108. In response, the Q output of flip-flop 108 switches to logic zero which turns off relay driver transistor 118 to open relay terminals 36 and disable the pager amplifier. Simultaneously, the complementary output $\overline{Q}$ of flip-flop 108 switches to logic one and disables beep-back oscillator 120 through NOR gate 122.

After a 20 minute interval, the output 104 of counter 94 switches to logic one. Output 104 resets flip-flop 110 which disables master clock 96. In the event that the pager phone is answered, however, a logic one voltage on reset line 124 (FIG. 3A) is superimposed on the 20 minute counter output 104, thereby resetting the circuit 64.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

We claim:

1. A station selective paging and intercommunication system comprising:
    at least three transceiver units operatively connected in parallel to each other with each unit having its own self-contained power source;
    each of said transceiver units also having push-to-page and push-to-talk switches and responsive thereto means for permitting individual selective addressing and communication between any two units without paging or communicating with any of the remaining at least three transceiver units, each of said units being selectively addressable by paging the unit no longer than a predetermined time interval and once addressed generating a responsive beep back signal to the sending transceiver unit to indicate it is receiving the paging signal; and
    each of said means for permitting individual selective addressing and communication having signal encoder and decoder circuitry, said decoder being dual tone, multifrequency responsive depending upon the particular unit selected for addressing and communication.

2. A station selective paging and intercommunication system comprising:
    at least three transceiver units operatively connected in parallel to each other with each unit having its own self-contained power source;
    each of said transceiver units also having push-to-page and push-to-talk switches and response thereto means for permitting individual selective addressing and communication between any two units without paging or communicating with any of the remaining at least three transceiver units, each of said units being selectively addressable by paging the unit no longer than a predetermined time interval and once addressed, a visual indicator becoming operative for a predetermined time interval should the transmitted page signal not be answered; and
    each of said means for permitting individual selective addressing and communication having signal encoder and decoder circuitry, said decoder being dual tone, multifrequency responsive depending upon the particular unit selected for addressing and communication.

* * * * *